United States Patent
Kieser et al.

(10) Patent No.: US 8,676,171 B2
(45) Date of Patent: Mar. 18, 2014

(54) SHORT URL METADATA MERGE APPLICATION

(75) Inventors: Brian Kieser, Philadelphia, PA (US); Edwin Watkeys, Philadelphia, PA (US)

(73) Assignee: Resonate Mobile, Inc., Philadelphia, PA (US)

( * ) Notice: Subject to any disclaimer, the term of this patent is extended or adjusted under 35 U.S.C. 154(b) by 311 days.

(21) Appl. No.: 13/278,588

(22) Filed: Oct. 21, 2011

(65) Prior Publication Data

US 2012/0100838 A1    Apr. 26, 2012

Related U.S. Application Data

(60) Provisional application No. 61/405,385, filed on Oct. 21, 2010.

(51) Int. Cl.
*H04M 3/42*    (2006.01)
*H04W 4/00*    (2009.01)

(52) U.S. Cl.
USPC .............. 455/414.1; 455/466; 705/14.64; 705/14.54

(58) Field of Classification Search
USPC .............. 455/414.1, 466; 705/14.49–14.56, 705/14.64
See application file for complete search history.

(56) References Cited

U.S. PATENT DOCUMENTS

2009/0312040 A1 * 12/2009 Gupta et al. .............. 455/466
2011/0230176 A1 *  9/2011 Kumar et al. ............. 455/414.3

* cited by examiner

*Primary Examiner* — Wesley Kim
*Assistant Examiner* — Nam Huynh
(74) *Attorney, Agent, or Firm* — Pepper Hamilton LLP

(57) ABSTRACT

This invention provides a method of merging metadata generated during an SMS interaction on a mobile device, with metadata gleaned from the User Agent and the resulting Internet Multimedia Content Session (internet/web, video, audio, image, email, etc.).

10 Claims, 2 Drawing Sheets

SHORT URL METADATA MERGE APPLICATION

FIELD OF THE INVENTION

This invention relates to method of merging metadata generated during mobile device interactive sessions, which includes without limitation 1) SMS Metadata, 2) User Agent Metadata, 3) Internet Multimedia Content Session Metadata.

BACKGROUND OF THE INVENTION

In Marketing terms, Short Message Service (SMS) is currently used, predominantly, to push SMS messages to people who have opted-in to receive them. Occasionally those messages contain Internet links that people with the appropriate mobile device, applications and data plans, can click to access Internet content. These links are either standard URL's or use a traditional URL shortening service (i.e. Bit.ly, tinyurl.com, etc). When a consumer views the SMS message with the link to the content, and clicks or taps on the link, the consumer is typically led to a website that provides the Internet content to the consumer. The content website receives the request from the consumer as a new request, and cannot associate this request with the interactive SMS session that presented the link to the consumer.

To enable SMS to act as a real gateway to rich interactive content, it is important to merge the data generated from the SMS interaction, with the data generated from the User Agent and the resultant Multimedia Content Session. Indeed, uniting these disparate data sources is crucial to providing robust aggregate reporting and comprehensive interaction and session metrics.

When a Keyphrase SMS Message is sent from a mobile device to the SMS Decision Engine, requesting a multimedia link, certain SMS metadata is collected (as examples without limitation, known SMS metadata may include: mobile number, carrier, carrier transaction ID, timestamp, destination short code, etc).

Then in the Response SMS Message sent from the SMS Decision Engine to the mobile device, if a standard URL or shortened URL is included to link to the Multimedia Content Session, no information about the user or the resulting session is encoded. This is because both options (URL or URL shortening service) create a single URL, sent in response to all link requests, and followed by all users interacting with the Internet content.

This means that a standard Long URL or a traditional URL shortening service is incapable of associating the SMS metadata with the User Agent and Multimedia Content Session metadata.

Interactive campaigns using the mobile device are provided by the organizations that create the content for distribution. This content can be advertising content, educational content, etc. These organizations seek to collect information about the performance of the campaigns, or calculate a return on investment (ROI). The SMS metadata contains additional data not found in the User Agent and Multimedia Content Session metadata, and merging these three sets of data into one comprehensive set of data exponentially increases the value provided to these organizations.

BRIEF DESCRIPTION OF THE DRAWINGS

The present invention will be better understood with reference to the following description taken in combination with the drawings. For the purpose of illustration, there are shown in the drawings certain embodiments of the present invention. In the drawings, like numerals indicate like elements throughout. It should be understood, however, that the invention is not limited to the precise arrangements, dimensions, and instruments shown. In the drawings.

DETAILED DESCRIPTION OF THE INVENTION

The present invention provides a solution to merge metadata from an SMS session, User Agent and an Internet Multimedia Content session. In the course of an SMS interaction, an SMS message containing a link to an Internet Multimedia (web, video, audio, image, etc) Content Session on a mobile device or internet browsing device, is associated to the Multimedia Content Session initiated from the mobile device or internet browsing device, via a dynamically generated unique URL. This invention works in conjunction with an existing SMS Decision Engine. This decision engine works by sending and receiving predetermined SMS messages to and from the mobile device. A message sent by a consumer is a Keyphrase SMS message, and one delivered to the consumer is the Response SMS message.

The present invention solves the described problem by dynamically generating a Unique Short URL for every Keyphrase SMS Message requesting a URL link to Internet Multimedia Content.

When a Unique Short URL is created according to the present invention, it compiles and associates the following information: 1) the destination URL to the Multimedia Content, i.e., the "Asset", 2) the metadata gleaned from the SMS interaction (e.g., mobile number, carrier, carrier transaction ID, timestamp, destination short code, etc.), and 3) the date and time that the URL was generated.

The present invention generates a "Token" based on this information, which is then used to construct a short URL. The resulting Token stores the short URL, and the SMS Interaction metadata. When this short URL is accessed via tapping, selecting, clicking or otherwise following the URL from within a mobile device's SMS messaging application, or is later clicked from an e-mail message or other dynamically-generated piece of content, a "Tap" event is generated, which 1) redirects the user to the destination URL, 2) records the data and time that the access is taking place, 3) records what token was used to access the asset's destination URL, and 4) records metadata about the device and software that is being used to access the asset.

Figure 1:
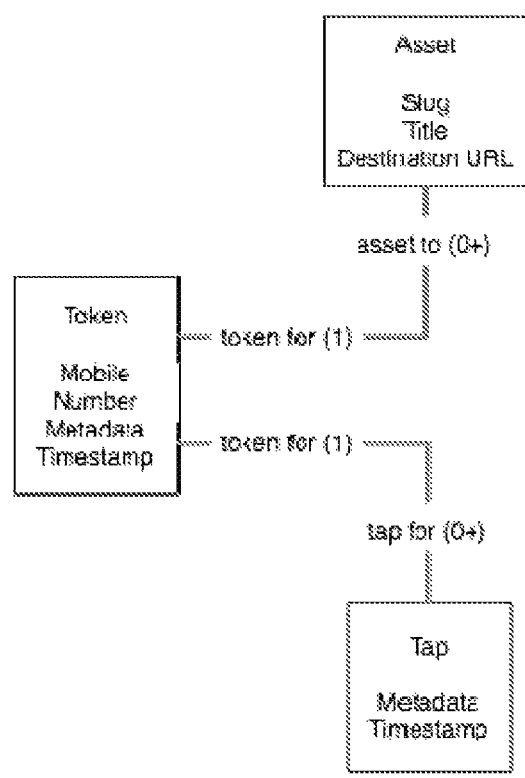
FIG. 1 is an illustration of the relationship between Asset, Token, and Tap.

Hence, the Token and Short URL allow the metadata from the SMS Interaction via the Asset and SMS with the metadata from the User Agent and the Internet Multimedia Content Session via the Tap event. The relationship between these entities (Asset, Token, Tap) is described in FIG. 1.

Figure 2:
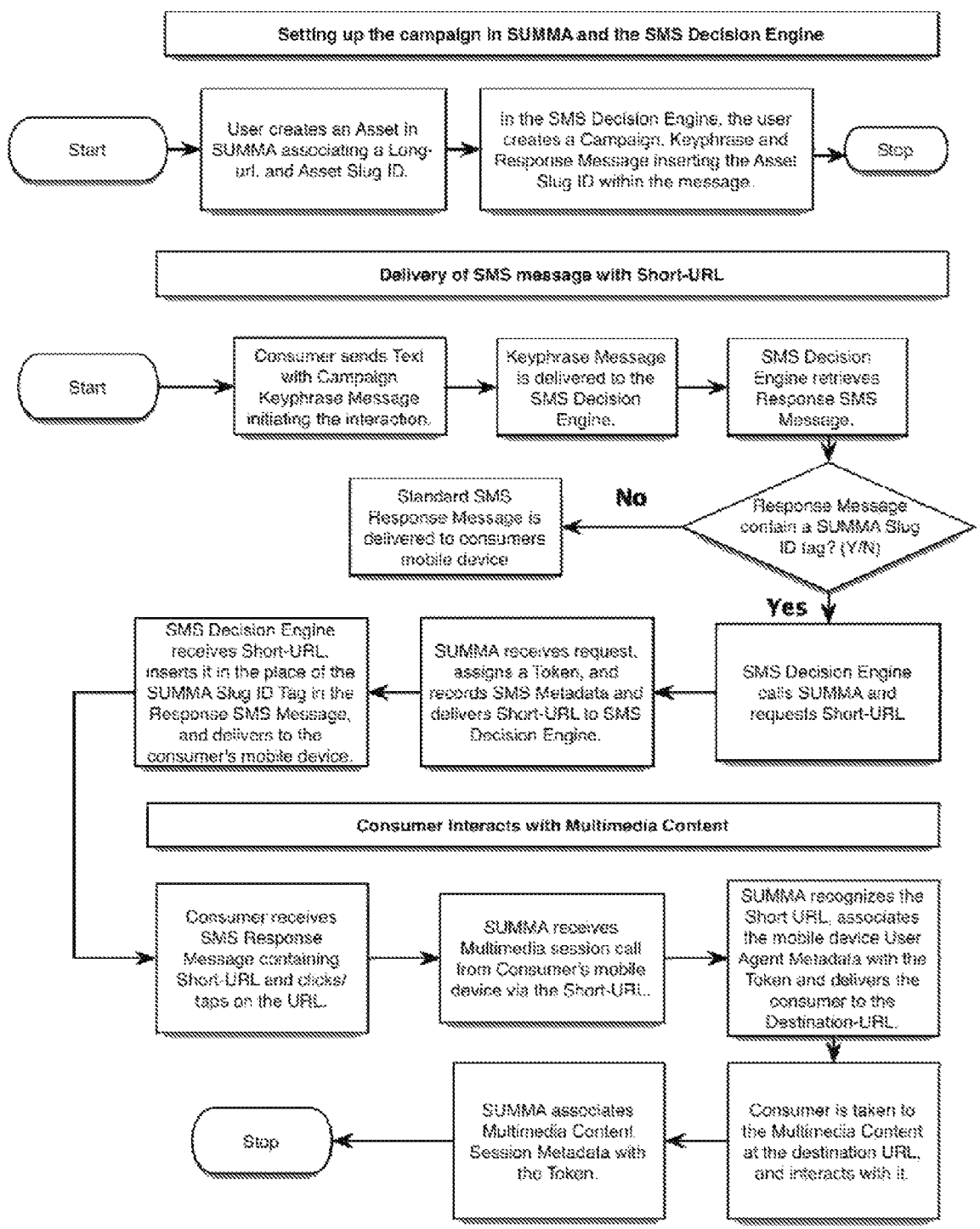
FIG. 2 provides an illustration of the steps involved with creating a Campaign, Delivering an SMS message, and the consumer interacting with the Multimedia Content

A step by step walkthrough, from creating an Asset, to merging the Metadata can be found in FIG. 2, and the below is a summary of the process: (N.B.: 'User' refers to the party hosting and sharing multimedia and/or interactive content via SMS, and 'Consumer' refers to the party who requests that content from the User via SMS.

Step 1. User creates an Asset in using present invention Short-URL Metadata Merge Application (SUMMA), and using the SMS Decision Engine, creates a Campaign, Keyphrase and Response Message.

Step 2. The consumer requests a message containing a SUMMA Asset Slug ID by sending a text message with the appropriate Keyphrase.

Step 3. The consumer receives the Response SMS Message containing the Short-URL, clicks/taps and enjoys the Multimedia Content.

Step 4. SUMMA records and merges the Metadata from the SMS interaction, with the User Agent and Multimedia Content Session Metadata and makes it available for reporting for the User.

As an example of the present invention applied to the advertising industry, Advertiser X launches a "New Product", and they can use technology provided by Resonate™ to create an SMS initiated campaign driving consumers to a mobile landing page, giving the consumer more information on the new product. Advertiser X uses SUMMA and the SMS Decision Engine to set up the mobile landing page, campaign, keyphrase, etc.

For the campaign the advertiser uses newspaper advertisements, or any other applicable media, to prompt the consumers to text a specific phrase to a designated number, e.g., "NEW PRODUCT" to 88388, for more information. Within seconds of sending the initiation SMS, the consumer receives a Response SMS Message containing a Short-URL to the new product mobile landing page.

The consumer clicks/taps on this Short-URL link and is taken first to a redirect page, which records the User Agent metadata; then the consumer is taken to the destination URL where the consumer browses the content on the landing page. The consumer's actions (Multimedia Content Session Metadata) in browsing the landing page are associated with the other metadata via the token for later reporting.

Advertiser X can run reports on the merged metadata to gather information on consumer's preference and make decisions to optimize the New Product's campaign.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. Specific dimensions of any particular embodiment are described for illustration purposes only. It should therefore be understood that this invention is not limited to the particular embodiments described herein, but is intended to include all changes and modifications that are within the scope and spirit of the invention.

What is claimed is:

1. A method of merging metadata from a Short Message service (SMS) session, comprising the steps of:
   receiving a SMS message from a consumer with a keyphrase;
   extracting metadata from the SMS message interaction;
   assigning a token to the SMS message interaction metadata;
   constructing a short Uniform Resource Locator (URL) based on partially on the SMS message interaction metadata;
   delivering the short URL to the consumer by a response SMS message;
   receiving a multimedia call from the consumer as a result of the consumer accessing the short URL;
   recognizing the short URL used by the consumer and associating user agent metadata with the token;
   redirecting the consumer to a destination URL, where the consumer interacts with multimedia content; and
   associating multimedia content session metadata with the token.

2. The method of claim 1, wherein the SMS message interaction metadata includes at least one of mobile phone number, carrier, carrier transaction ID, timestamp, and destination short code.

3. The method of claim 1, wherein the short URL associates with the destination URL, SMS message metadata; and data and time the short URL is generated.

4. The method of claim 1, wherein the token stores the short URL and SMS interaction metadata.

5. The method of claim 4, wherein the token further stores metadata from the multimedia call.

6. The method of claim 5, wherein the token stores data and time of the multimedia call.

7. The method of claim 5, wherein the token further stores device and software used to access the multimedia call.

8. The method of claim 1, wherein the multimedia content session metadata is derived from the consumer's actions in browsing the multimedia content at the destination URL.

9. The method of claim 1, further comprising the step of merging SMS interaction metadata, user agent metadata, and Multimedia content session metadata.

10. The method of claim 9, further comprising the step of reporting the merged metadata.

* * * * *